United States Patent
Traidia et al.

(10) Patent No.: US 12,169,043 B2
(45) Date of Patent: Dec. 17, 2024

(54) EXTRUDED ALIPHATIC POLYKETONE PERMEATION BARRIER FOR SPOOLABLE COMPOSITE PIPES

(71) Applicant: SAUDI ARABIAN OIL COMPANY, Dhahran (SA)

(72) Inventors: Abderrazak Traidia, Lussan (FR); Abdullah Al Shahrani, Dammam (SA); Anwar Parvez, Dhahran (SA); Konstantinos Vatopoulos, Amsterdam (NL); Waleed Al Nasser, Ad Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/740,031

(22) Filed: May 9, 2022

(65) Prior Publication Data
US 2022/0373107 A1 Nov. 24, 2022

Related U.S. Application Data

(60) Provisional application No. 63/188,549, filed on May 14, 2021.

(51) Int. Cl.
*F16L 9/147* (2006.01)
*B29C 48/00* (2019.01)
(Continued)

(52) U.S. Cl.
CPC ............ *F16L 9/147* (2013.01); *B29C 48/022* (2019.02); *B29C 48/09* (2019.02); *B29C 48/21* (2019.02);
(Continued)

(58) Field of Classification Search
CPC ... F16L 9/147; F16L 9/04; F16L 58/00; B29C 48/09; C08G 2/16; B32B 1/08;
(Continued)

(56) References Cited

U.S. PATENT DOCUMENTS 5,570,711 A 11/1996 Walsh
5,957,164 A 9/1999 Campbell
(Continued)

FOREIGN PATENT DOCUMENTS

CA 2619808 * 8/2002 .............. F16L 11/22
CA 2 619 808 C 4/2015
(Continued)

OTHER PUBLICATIONS

Kau, James C., et al. "Polyketone polymers: a new liner material for corrosion control in oil and gas industry", InCorrosion 2000. Mar. 26, 2000, pp. 1-16, [16 Pages].
(Continued)

*Primary Examiner* — Michael C Miggins
(74) *Attorney, Agent, or Firm* — Osha Bergman Watanabe & Burton LLP

(57) ABSTRACT

Spoolable composite pipes for oil and gas flowlines may include an inner extruded tubular liner, a reinforcement layer surrounding the inner extruded tubular liner, and an outer extruded tubular cover surrounding the reinforcement layer. In these spoolable composite pipes, the inner extruded tubular liner may include an aliphatic polyketone. Internally lined pipes for oil and gas flowlines for oil and gas flowlines may include inner extruded tubular liner containing an aliphatic polyketone, and a carbon steel pipe surrounding the inner extruded tubular liner. The spoolable composite pipes and the internally lined pipes may be configured to operate at temperatures of up to about 110° C., and to carry
(Continued)

hydrocarbons having an aromatic content of up to about 35% by volume of the total hydrocarbons content.

20 Claims, 7 Drawing Sheets

(51) Int. Cl.
| | |
|---|---|
| B29C 48/09 | (2019.01) |
| B29C 48/21 | (2019.01) |
| B29K 96/00 | (2006.01) |
| B29L 23/00 | (2006.01) |
| B32B 1/08 | (2006.01) |
| B32B 15/08 | (2006.01) |
| B32B 15/18 | (2006.01) |
| B32B 27/06 | (2006.01) |
| B32B 27/12 | (2006.01) |
| B32B 27/28 | (2006.01) |
| C08G 2/16 | (2006.01) |
| F16L 9/04 | (2006.01) |
| F16L 58/00 | (2006.01) |

(52) U.S. Cl.
CPC .......... *B32B 1/08* (2013.01); *B32B 15/08* (2013.01); *B32B 15/18* (2013.01); *B32B 27/06* (2013.01); *B32B 27/12* (2013.01); *B32B 27/288* (2013.01); *C08G 2/16* (2013.01); *F16L 9/04* (2013.01); *F16L 58/00* (2013.01); *B29K 2096/00* (2013.01); *B29L 2023/22* (2013.01); *B32B 2597/00* (2013.01)

(58) Field of Classification Search
CPC ......... B32B 15/08; B32B 15/18; B32B 27/06; B32B 27/12; B32B 27/288
See application file for complete search history.

(56) References Cited

U.S. PATENT DOCUMENTS

| | | |
|---|---|---|
| 6,039,085 A | 3/2000 | Hsich |
| 6,180,197 B1 | 1/2001 | Nie et al. |
| 6,240,970 B1 | 6/2001 | Ostrander et al. |
| 6,257,281 B1 | 7/2001 | Nie et al. |
| 6,374,862 B1 | 4/2002 | Schwert |
| 6,378,562 B1 | 4/2002 | Noone et al. |
| 6,852,188 B2 | 2/2005 | Stripe |
| 6,989,198 B2 | 1/2006 | Masuda et al. |
| 7,001,446 B2 | 2/2006 | Roark et al. |
| 7,550,185 B2 | 6/2009 | Ling et al. |
| 7,866,348 B2 | 1/2011 | Garver et al. |
| 8,470,423 B2 | 6/2013 | Jarvenkyla |
| 8,678,042 B2 | 3/2014 | Quigley et al. |
| 8,763,647 B2 | 7/2014 | Quigley et al. |
| 8,789,597 B2 | 7/2014 | Al-Shammari |
| 9,289,966 B2 | 3/2016 | Fischer et al. |
| 9,395,022 B2 | 7/2016 | Glejbol |
| 9,772,052 B2 | 9/2017 | Garver et al. |
| 9,982,809 B2 | 5/2018 | Nadeau et al. |
| 10,513,581 B2 | 12/2019 | Jeol et al. |
| 10,816,113 B2 | 10/2020 | Berger et al. |
| 10,889,081 B2 | 1/2021 | Kremer et al. |
| 11,149,879 B2 | 10/2021 | Berger et al. |
| 11,300,231 B2 | 4/2022 | Jaspaert |
| 2001/0021426 A1 | 9/2001 | Procida et al. |
| 2003/0087052 A1 | 5/2003 | Wideman et al. |
| 2004/0035485 A1 | 2/2004 | Gleim et al. |
| 2004/0194838 A1 | 10/2004 | Glejbol et al. |
| 2005/0217747 A1 | 10/2005 | Buriak et al. |
| 2006/0191587 A1* | 8/2006 | Gerez ............... F16L 11/082 138/129 |
| 2008/0187701 A1 | 8/2008 | Dabouineau |
| 2008/0210329 A1 | 9/2008 | Quigley et al. |
| 2009/0286028 A1 | 11/2009 | Garver et al. |
| 2013/0306652 A1 | 11/2013 | Andernach et al. |
| 2014/0182735 A1 | 7/2014 | Dyksterhouse |
| 2015/0044407 A1 | 2/2015 | Som et al. |
| 2015/0053293 A1 | 2/2015 | Ophaug |
| 2016/0069503 A1 | 3/2016 | Messina et al. |
| 2017/0227160 A1 | 8/2017 | Reichel et al. |
| 2020/0080236 A1 | 3/2020 | Fischer et al. |
| 2020/0180258 A1 | 6/2020 | Makadia |
| 2021/0356056 A1 | 11/2021 | Doufas et al. |
| 2022/0373107 A1 | 11/2022 | Traidia et al. |

FOREIGN PATENT DOCUMENTS

| | | | |
|---|---|---|---|
| CN | 104960251 A | 10/2015 | |
| CN | 114456470 A | 5/2022 | |
| EP | 728976 B1 | 1/1999 | |
| EP | 1563007 B1 | 3/2007 | |
| EP | 2990707 * | 2/2016 | ............. F16L 9/147 |
| EP | 2 990 707 A1 | 3/2016 | |
| EP | 3301122 A1 | 4/2018 | |
| EP | 3301126 A1 | 4/2018 | |
| WO | 9967560 A1 | 12/1999 | |
| WO | 2010070324 A1 | 6/2010 | |
| WO | 2014040624 A1 | 3/2014 | |
| WO | 2015097422 A1 | 7/2015 | |
| WO | 2017000010 A1 | 1/2017 | |
| WO | 2021084236 A1 | 5/2021 | |
| WO | 2021188528 A1 | 9/2021 | |

OTHER PUBLICATIONS

Stearman, Zach, et al. "Value Proposition of Polyketone Liners & Continuous Rod in Deviated Wells", Lightening Production Services. 2017, pp. 1-30, [30 Pages].
Williams, Jerry G., et al. "Composite Spoolable Pipe Development, Advancements, and Limitations", InOffshore Technology Conference 2000. May 1, 2000, pp. 1-16, [16 Pages].
"Poketone: Tubing wear & corrosion Solution for Oil & Gas Industry", Hyosung Chemical. pp. 1-3, [3 Pages].
Lin, Harrison, et al. "Influence of hygrothermal conditioning on the chemical structure and thermal mechanical properties of aliphatic polyketone", Polymer Degradation and Stability. Jun. 2020, pp. 1-6, [6 Pages].
Baron, J. J., et al. "Non-metallic liners for gas/condensate pipelines", InCorrosion 2000. Mar. 26, 2000, pp. 1-15, [15 Pages].
Venkateswaran, Sai P., et al. "Expanded Service Temperature of Polymer Liners for Water Injection Pipelines", InCorrosion 2019. Mar. 24, 2019, pp. 1-1, [1 Page].
International Search Report issued in International Application No. PCT/US2022/028577 dated Jul. 20, 2022 (3 pages).
Written Opinion issued in International Application No. PCT/US2022/028577 dated Jul. 20, 2022 (5 pages).
International Preliminary Report On Patentability in International Application No. PCT/US2022/028577 dated Nov. 13, 2023 (6 pages).
M. M. Ali, et al., "Corrosion protection of steel pipelines with metal-polymer composite barrier liners", Journal of Natural Gas Science and Engineering, Sep. 1, 2020, vol. 81, 103401, pp. 1-7 (7 pages).
G. Hopf, et al., "Development of Multilayer Thermoplastic Fuel Lines With Improved Barrier Properties", SAE Technical Paper Series, Jan. 1, 1994 (19 pages).
P. Ge, et al., "Prediction of ultimate burst pressure and comparison of failure criteria for thermoplastic composite pipes", Earth and Environmental Science, Apr. 1, 2021, vol. 725, No. 1, IOP Publishing, pp. 1-9 (9 pages).
H. Li, et al., "Molecular Simulation on Permeation Behavior of CH4/CO2/H2S Mixture Gas in PVDF at Service Conditions", Polymers, Jan. 28, 2022, vol. 14, No. 3, 545, pp. 1-13 (13 pages).
"Thermoflex Composite Pipe", https://www.thermoflexpipe.com/products/thermoflex/ (5 pages).
B. Bulleri et al., "Engineering Thermoplastic—Liners", Paper presented at the Corrosion 2004, New Orleans, Louisiana, Mar. 2004, pp. 1-14 (14 pages).

(56) References Cited

OTHER PUBLICATIONS

S. P. Venkateswaran et al., "Expanded Service Temperature of Polymer Liners for Water Injection Pipelines", Paper presented at the Corrosion 2019, Nashville, Tennessee, USA, Mar. 2019 (14 pages).

G. R. Ruschau, "Novel Polymers for Applications as Liners", Paper presented at the Corrosion 2000, Orlando, Florida, Mar. 2000, pp. 1-13 (13 pages).

H. U. Khalid et al., "Permeation Damage of Polymer Liner in Oil and Gas Pipelines: A Review", Polymers, 2020, vol. 12, 2307, pp. 1-31 (31 pages).

Veith, Cary A. "Advances in Aliphatic Polyketone Composites", SPE ACCE Presentation, Esprix Technologies. Sep. 8, 2017, pp. 1-37 [37 Pages].

Flaconnèche, B. et al., "Permeability, Diffusion and Solubility of Gases in Polyethylene, Polyamide 11 and Poly (vinylidene fluoride)"; Oil & Gas Science and Technology—Revue d'IFP Energies nouvelles; vol. 56, No. 3; pp. 261-278; 2001 (18 pages).

International Search Report issued for corresponding international patent application No. PCT/US2024/028137, mailed Jul. 30, 2024 (5 pages).

Written Opinion issued for corresponding international patent application No. PCT/US2024/028137, mailed Jul. 30, 2024 (7 pages).

\* cited by examiner

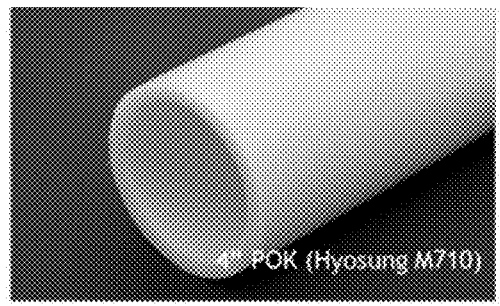
FIG. 5A
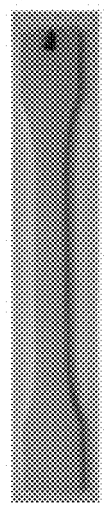
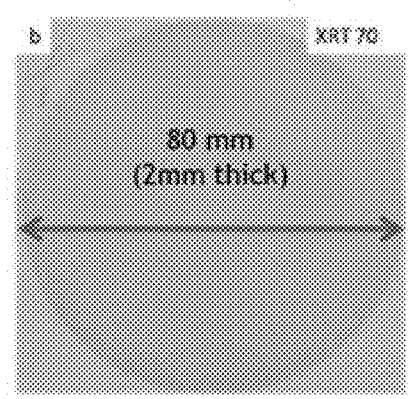
FIG. 5B  FIG. 5C
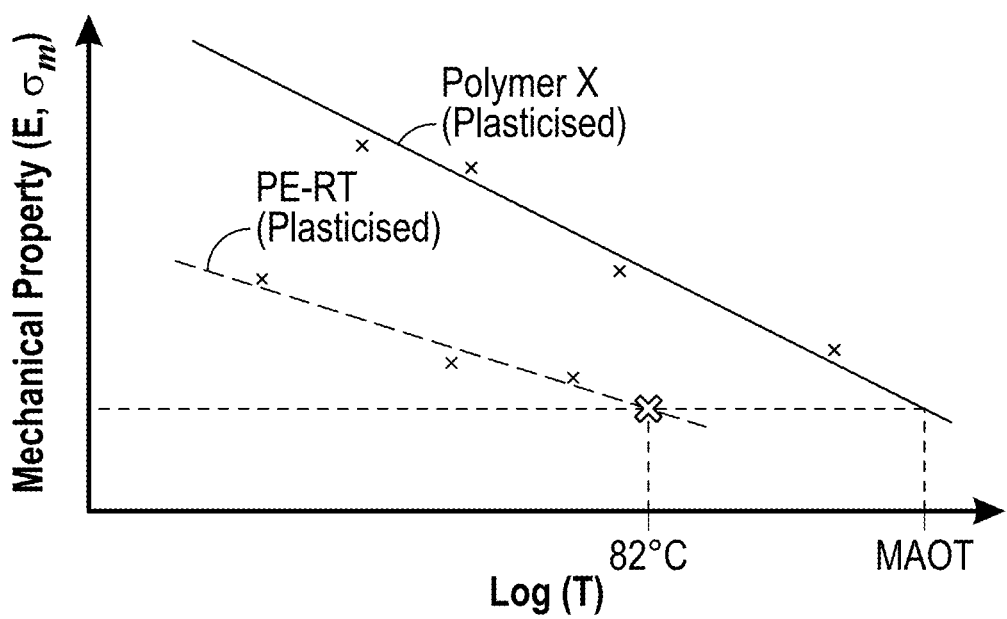
FIG. 6

EXTRUDED ALIPHATIC POLYKETONE PERMEATION BARRIER FOR SPOOLABLE COMPOSITE PIPES

BACKGROUND

Spoolable composite pipes may be used for fluid transportation applications, including, in particular, offshore oil and gas production. Spoolable composite pipes generally include several layers of material where a reinforcement material is wound around an extruded liner, and a thermoplastic cover is extruded over the reinforcement layer. After production, spoolable composite pipes may be spooled in reels and shipped in a truck loading to the field for installation. Spoolable composite pipes may include various products such as reinforced thermoplastic pipes (RTP), spoolable glass reinforced epoxy pipes (s-GRE), or thermoplastic composite pipe (TCP). Generally, in RTPs and s-GREs, the layers are either unbonded or semi-bonded, whereas in TCPs, all of the layers are melt-fused together to create a fully bonded structure. RTPs and s-GREs are normally qualified in accordance with API 15 S standard requirements, whereas TCPs are normally qualified in accordance with DNVGL-ST-F119 requirements.

Although the use of spoolable composite pipes has mostly been limited to water applications in the oil and gas industry, these types of pipes are increasingly being introduced to fields where hydrocarbons are present with high level of water cut in addition to hydrogen sulfide, carbon dioxide, and methane mixtures. However, such spoolable composite pipes are limited in terms of their nominal size, as well as their temperature and pressure ratings, which may result in significant operational limitations in terms of performance or cost. In particular, while polyethylene polymers have been used in s-GRE products as a matrix and fibers in the reinforcement layer, these spoolable composite pipes have been limited in terms of their temperature rating and their mechanical properties, such as modulus and strength, when exposed to high aromatic components at high temperatures. Further, while polyethylene polymers have also been used in the liner layer of RTP and steel pipes, these liner layers exhibited lower physical and mechanical properties when exposed to higher temperatures. Such liner layers also resulted in aromatic hydrocarbon uptake when exposed to high aromatic components as well as permeation when used in sour environments.

Similarly, the swelling and plasticization effects of polyethylene polymers used in liners in polymer-lined carbon steel pipes used in the presence of aromatic crude or the permeation and resulting corrosion effects of such polymer-lined carbon steel pipes limit their maximum allowable operating temperatures or require costly material upgrades.

SUMMARY

Certain embodiments of the disclosure will be described with reference to the accompanying drawings, where like reference numerals denote like elements. It should be understood, however, that the accompanying figures illustrate the various implementations described and are not meant to limit the scope of various technologies described.

In one aspect, embodiments herein are directed to spoolable composite pipes for oil and gas flowlines. The spoolable composite pipes may include an inner extruded tubular liner, a reinforcement layer surrounding the inner extruded tubular liner, and an outer extruded tubular cover surrounding the reinforcement layer. In these spoolable composite pipes, the inner extruded tubular liner may include an aliphatic polyketone having the formula (I):

$$[[-CH_2CHR_1(C\!\!=\!\!O)-]_n[-CH_2CHR_2(C\!\!=\!\!O)-]_m]_p, \quad (I)$$

where $R_1$ and $R_2$ are independently from one another the same or different and selected from the group consisting of hydrogen and an alkyl group, where n is less than 0.5 and n+m=1, where p is an integer between 500 and 5000, where structural units $[-CH_2CHR_1(C\!\!=\!\!O)-]$ and $[-CH_2CHR_2(C\!\!=\!\!O)-]$ are randomly distributed, blocked or both. Further, the spoolable composite pipes may be configured to operate at temperatures of up to about 110° C. and to carry hydrocarbons having an aromatic content of up to about 35% by volume based on the total hydrocarbons content.

In another aspect, embodiments herein are directed to internally lined pipes for oil and gas flowlines for oil and gas flowlines. The internally lined pipes may include inner extruded tubular liner, and a carbon steel pipe surrounding the inner extruded tubular liner. In the internally lined pipes, the inner extruded tubular liner may include an aliphatic polyketone having the formula (I). Further, the internally lined pipes may be configured to operate at temperatures of up to about 110° C., and to carry hydrocarbons having an aromatic content of up to about 35% by volume of the total hydrocarbons content.

Other aspects and advantages of this disclosure will be apparent from the following description made with reference to the accompanying drawings and the appended claims.

BRIEF DESCRIPTION OF DRAWINGS

FIGS. 5A-5C are photographs of test specimens prepared from aliphatic polyketones according to Example 1. FIG. 5A shows a sample pipe specimen. FIG. 5B shows a sample tensile test specimen. FIG. 5C shows a permeation test specimen.

FIG. 6 is a graph illustrating the determination of maximum allowable operating temperature (MAOT) of a hypothetical Polymer X post exposure to aromatic hydrocarbons by benchmarking to raised temperature polyethylene (PE-RT) aged and tested at 82° C. according to Example 2.

DETAILED DESCRIPTION

Several strategies have been employed to improve the operating condition ratings of spoolable composite pipes or lined carbon steel pipes. In particular, several materials have been used in order to overcome spoolable composite pipes limitations in terms of nominal size, temperature and pressure ratings. For example, polyethylene and raised temperature polyethylene have been employed in the liner and reinforcement layer. However, the main issue with polyethylene when used at high temperature in oil & gas environment is the reduction in mechanical properties, such as modulus and strength, due to the material degradation, for example matrix plasticization, as a result of aromatic hydrocarbon uptake or swelling.

The tensile yield stress of common oil and gas polyethylene grades (PE100 and PE-RT) has been shown to be strongly dependent on temperature and oil saturation. The swelling values increase as a function of temperature, which promotes solvent polymer interaction forces leading to higher swelling in hydrocarbon fluids, resulting in the deterioration of the corresponding material's mechanical properties.

Figure 1:
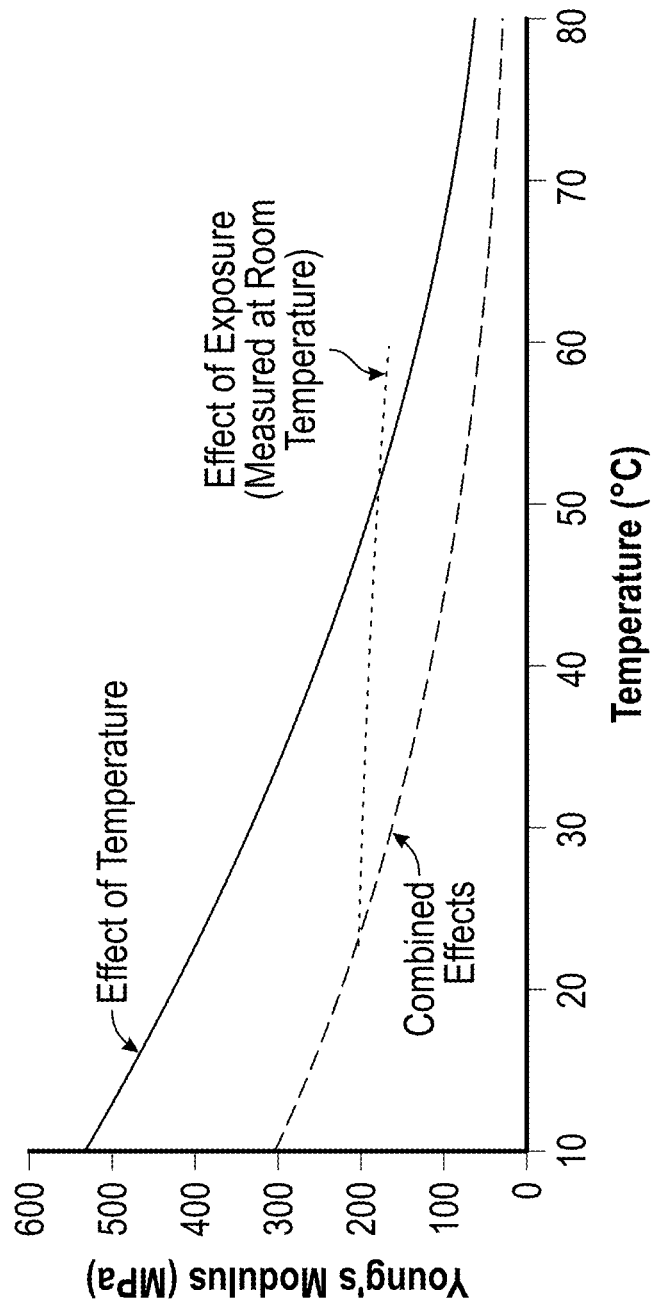
FIG. 1 is a graph representing the Young's Modulus of an HDPE sample exposed to liquid hydrocarbons having an aromatic content of 19% based on the total volume of liquid in function of the temperature (reproduced from J. J. Baron, K. E. Szklarz and L. C. MacLeod, "Non-metallic liners for gas/condensate pipelines," in *NACE Corrosion*, Houston, TX, USA, 2000).

FIG. 1 illustrates the results of a study conducted to evaluate the combined effect of hydrocarbon exposure composition and temperature on tensile modulus and dimensional stability (swelling) of HDPE material. In Baron et al. (J. J. Baron, K. E. Szklarz and L. C. MacLeod, "Non-metallic liners for gas/condensate pipelines," in *NACE Corrosion*, Houston, TX, USA, 2000), HDPE coupons serving as non-metallic liners for gas/condensate pipelines were tensile tested at ambient conditions at 22° C., 40° C., and 60° C. to establish a baseline. A long-term test was conducted by immersing the HPDE coupons into hydrocarbon fluid composition having 19 wt % of aromatics at temperature ranging from room temperature to 60° C. After 4 and 8 months, the coupon samples were tensile tested and dimensionally measured. The combined effect of temperature and exposure to aromatic oil is shown in FIG. 1. In particular, FIG. 1 shows the initial exposure to the fluid composition at room temperature causing the mechanical properties to drop rapidly but once saturated, the exposure effect is relatively small and the temperature effect predominant the decrease in the mechanical properties until failure.

Due to the swelling and plasticization effect of polyethylene polymers in aromatic crude, the maximum allowable operating temperature has been limited to about 185° F. (85° C.) in aromatic crude service as increasing such operating temperature in oil and gas applications involving the use of polyethylene polymers in lining materials would require a costly upgrade of such fluid permeation barrier.

Therefore, there is a need for spoolable composite pipes or lined carbon steel pipes capable of transporting fluids, such as may be used in the oil and gas industry, while maintaining desirable physical and mechanical properties when exposed to higher temperatures, high aromatic components, and in sour environments.

Pipes and methods of preparing them are presented using an aliphatic polyketone in the lining material of spoolable composite pipes or lined carbon steel pipes to provide pipes capable to operate at temperatures of up to about 110° C. and to carry hydrocarbons having an aromatic content of up to about 35% by volume based on the total hydrocarbons content, in particular for oil and gas flowlines applications.

In particular, aliphatic polyketones may be represented by formula (I):

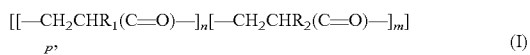

(I)

with $R_1$ and $R_2$ being independently from one another the same or different and selected from the group consisting of hydrogen and an alkyl group, n being less than 0.5 and n+m=1, and with p being an integer between 500 and 5000. The structural units [—CH$_2$CHR$_1$(C═O)—] and [—CH$_2$CHR$_2$(C═O)—] of such aliphatic polyketones may be randomly distributed, blocked or both.

More particularly, as represented by Scheme 1, aliphatic polyketones (e.g., $R_1$═H and $R_2$═methyl) may be produced from olefin monomers and carbon monoxide in the presence of a catalyst.

Scheme 1

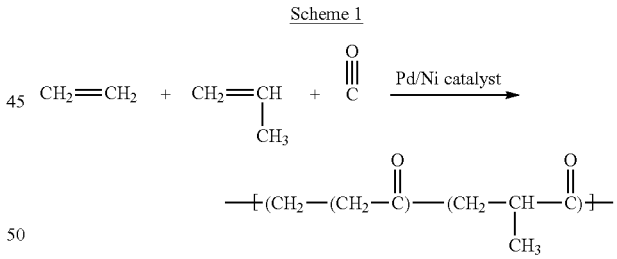

Figure 2:
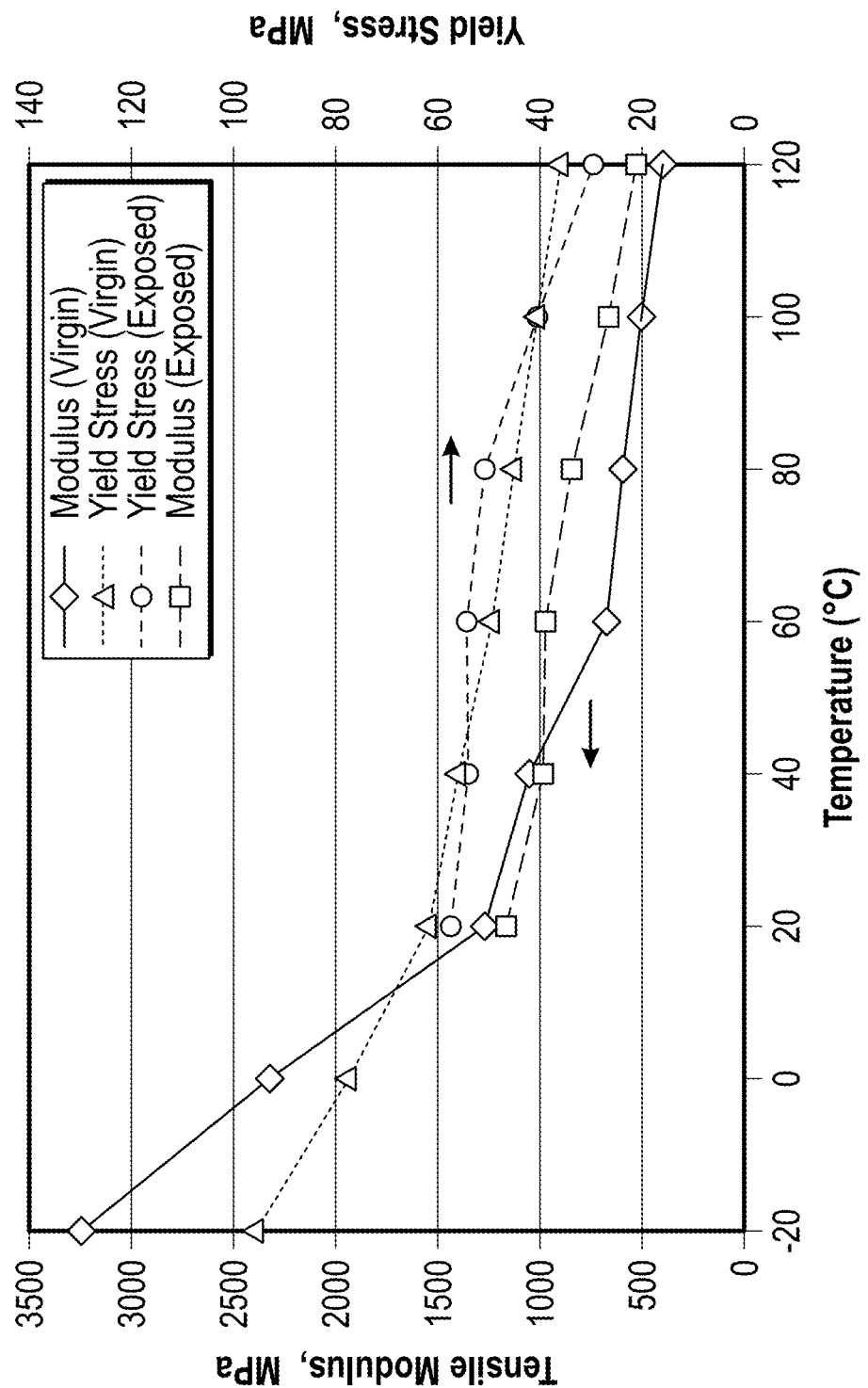
FIG. 2 is a graph representing the tensile modulus and tensile strength of an aliphatic polyketone (KETOPRIX™, Esprix Technologies) as a function temperature after exposure to crude oil at 80° C. (reproduced from CA. Veith, "Advances in Aliphatic Polyketone Composites," presented at SPE ACCE 2017).

For example, as illustrated in FIG. 2, aliphatic polyketones terpolymer of carbon monoxide, ethylene, and propylene such as POKETONE© (Hyosung Chemicals, South Korea) or KETOPRIX™ (Esprix Technologies, USA) and exhibit enhanced mechanical properties, such as tensile modulus, tensile strength, after exposure to crude oil, as well as improved chemical resistance (especially towards solvents and petroleum products), high service temperature, wear resistance and high toughness and barrier properties.

In one or more embodiments, spoolable composite pipes for oil and gas flowlines are presented. These pipes may include an inner extruded tubular liner, a reinforcement layer surrounding the inner extruded tubular liner, and an outer extruded tubular cover surrounding the reinforcement layer. The inner extruded tubular liner may contain an aliphatic polyketone having the formula (I). Such spoolable composite pipes may be configured to operate at temperatures of up to about 110° C. and to carry hydrocarbons having an aromatic content of up to about 35% by volume based on the total hydrocarbons content.

Figure 3:
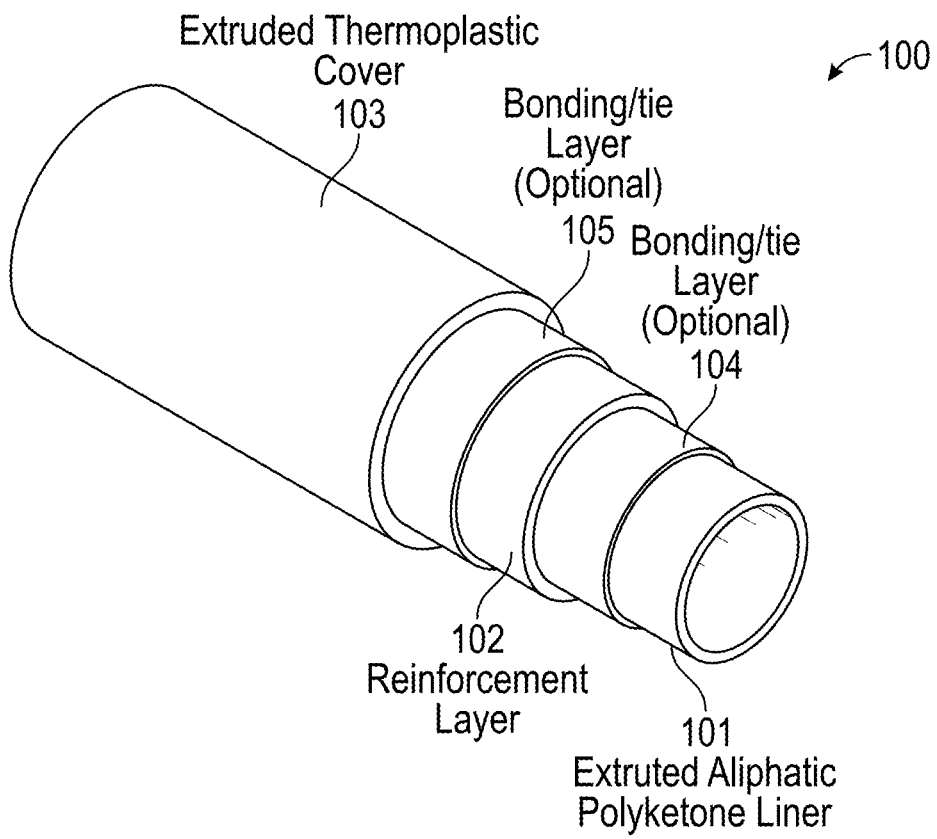
FIG. 3 is a schematic diagram of an exemplary spoolable composite pipe for use in oil and gas flowlines in accordance with one or more embodiments.

FIG. 3 is a diagram that illustrates an exemplary spoolable composite pipe 100 according to one or more embodiments. The spoolable composite pipe 100 may include an inner extruded aliphatic polyketone liner 101, a reinforcement layer 102 surrounding the inner extruded aliphatic polyketone liner 101, and an outer extruded thermoplastic cover 103 surrounding the reinforcement layer 102. The spoolable composite pipe 100 may optionally include a bonding or tie layer 104 between the extruded aliphatic polyketone liner 101 and the reinforcement layer 102. Further, the spoolable composite pipe 100 may optionally include a bonding or tie layer 105 between the reinforcement layer 102 and the extruded thermoplastic cover 103.

In one or more embodiments, internally lined pipes for oil and gas flowlines are presented. These pipes may include an inner extruded tubular liner and a carbon steel pipe surrounding the inner extruded tubular liner. The inner extruded tubular liner may contain an aliphatic polyketone having the formula (I). Such internally lined pipes may be configured to operate at temperatures of up to about 110° C. and to carry hydrocarbons having an aromatic content of up to about 35% by volume based on the total hydrocarbons content.

Figure 4:
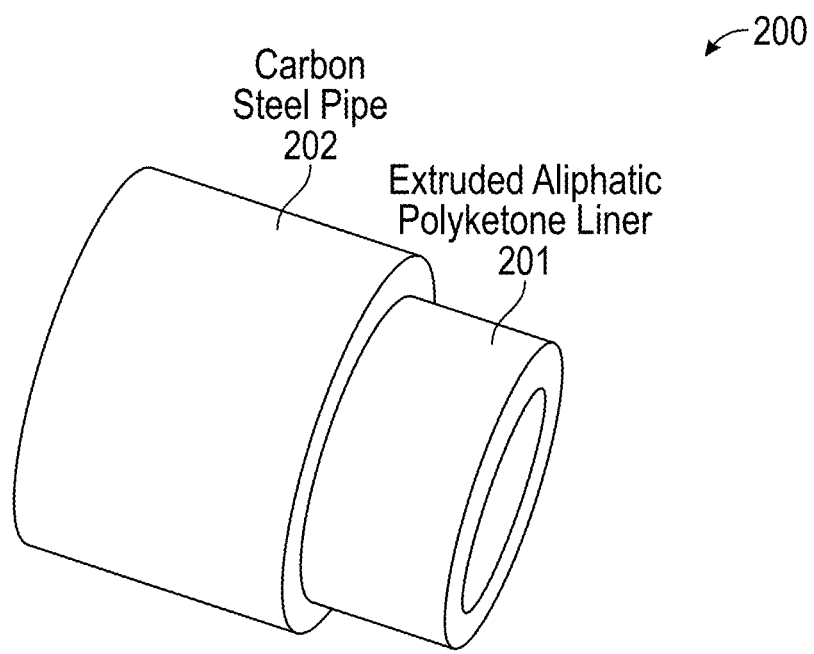
FIG. 4 is a schematic diagram of internally lined pipe for use in oil and gas flowlines in accordance with one or more embodiments.

FIG. 4 is a diagram that illustrates an exemplary internally lined pipe 200 according to one or more embodiments. The internally lined pipe 200 may include an inner extruded aliphatic polyketone tubular liner 201 and a carbon steel pipe 202 surrounding the inner extruded tubular liner 201.

The use aliphatic polyketones as a cost effective lining material or fluid permeation barrier for pipes for oil and gas flowlines operating at high temperatures, such as temperatures of up to about 110° C., or from about 80° C. to about 110° C., for carrying crude oil fluids having a high aromatic and cyclo aliphatic content, such as up to about 50% by volume based on the total hydrocarbons content, and where the aromatic content may be as high as about 35% by volume based on the total hydrocarbons content. The environment of these composite pipes may be sweet, with limited hydrogen sulfide ($H_2S$) or sour with $H_2S$ partial pressure of up to about 10 barg.

In some embodiments, the aliphatic polyketones may be represented by formula (I) with $R_1$ and $R_2$ being independently from one another the same or different and selected from the group consisting of hydrogen and an alkyl group. The alkyl group may be a substituted or an unsubstituted alkyl group and may include methyl, ethyl, propyl, butyl, pentyl, heptyl, hexyl, octyl, nonyl, decyl, undecyl, or dodecyl. In the aliphatic polyketones of formula (I), n may be less than or equal to 0.5 or from 0.02 to 0.5, n+m=1, and p may be an integer between 500 and 5000. The structural units [—$CH_2CHR_1(C=O)$—] and [—$CH_2CHR_2(C=O)$—] of such aliphatic polyketones may be randomly distributed, blocked or both.

In some embodiments, the liners may be standalone aliphatic polyketone extruded tubes as a monolayer system, or the aliphatic polyketone may be extruded with other thermoplastic polymers as a multilayer system. For example, the liners may include a thin layer of aliphatic polyketone as defined above, which may be the most inner layer in contact with the hydrocarbons of the crude oil fluid. Optional additional layers, which may be thicker than the inner aliphatic polyketone layer of the liner, may be of the same material or they may include polyethylene for example.

The lining material or fluid permeation barrier containing aliphatic polyketones provides a very low permeability to $CH_4$, $H_2S$ and $CO_2$. In addition, the lining material or fluid permeation barrier containing aliphatic polyketones has a high mechanical strength and is resistant to bending and stretching. Further, the pipes using lining material or fluid permeation barrier containing aliphatic polyketones according to one or more embodiments have chemical resistance, do not swell when contacted with hydrocarbons.

In some embodiments, the reinforcement layers may include dry glass fibers, aramid fibers, carbon fibers, steel fibers or strips, glass-reinforced epoxy laminates or unidirectional thermoplastic composite tapes.

In some embodiments, the outer extruded tubular cover may include polyolefins, engineered thermoplastics, or thermoplastic polyesters.

The configuration of the spoolable composite pipes may be unbonded, semi-bonded or fully bonded. In particular, aliphatic polyketones may be used as part of a fully bonded configuration where the reinforcement layer, if thermoplastic-based, may be fully fused to the liner tube via a heating process. Alternatively, a bonding or tie layer may be used layer between the liner and the reinforcement layer and/or between the reinforcement layer and the cover.

In some embodiments, extruded aliphatic polyketones may be used as a liner material for carbon steel pipes transporting hot sour wet hydrocarbons. In particular, the internally lined carbon steel pipes may be configured to operate in a dry gas environment having a hydrogen sulfide partial pressure of up to 10 barg. The internally lined pipes may have a permeability of less than about $2\ 10^{-7}\ cm^3(STP)\cdot cm/cm^2\cdot s\cdot bar$ when exposed to a dry gas environment comprising hydrogen sulfide, carbon dioxide, and methane, such as, for example about 10% hydrogen sulfide, 10% carbon dioxide, and 80% methane. The aliphatic polyketones-containing liner allows the prevention of corrosion of the carbon steel pipes while still retaining sufficient mechanical properties post-exposure to hydrocarbons. In particular, in some embodiments, the internally lined pipes retain the required mechanical properties post-exposure to highly aromatic hydrocarbons, from about 35% to about 50% by volume based on the total volume of hydrocarbon, at temperatures of up to about 110° C., or from about 90° C. to about 110° C., while equally providing sufficient barrier performance to the permeation of hazardous gases such $H_2S$ and $CO_2$. In addition, the retention of modulus may avoid liner collapse in case of rapid gas decompression, noting that avoiding liner collapse generally involves the use of venting systems where the permeated gases are allowed to diffuse horizontally along the liner until the pipe connectors, then re-injected again into the transported stream.

In some embodiments, the present disclosure relates to methods of producing spoolable composite pipes for oil and gas flowlines as described above. The methods may include extruding an aliphatic polyketone having the formula (I) to form an inner tubular liner; forming a reinforcement layer over the inner extruded tubular liner to form the spoolable composite pipe; and providing an outer extruded tubular cover over the reinforcement layer.

In some embodiments, the present disclosure relates to methods of producing an internally lined steel pipe for oil and gas flowlines as described above. The methods may include extruding an aliphatic polyketone having the formula (I) to form an inner tubular liner and internally lining the carbon steel pipe with the inner tubular liner.

In some embodiments, the present disclosure relates to methods of transporting a hydrocarbon fluid having an aromatic content of up to about 35% by volume based on the total hydrocarbons content. The method may include providing a spoolable composite pipe for oil and gas flowlines as described above and introducing the hydrocarbon fluid in the spoolable composite pipe. The method may alternatively include providing an internally lined pipe for oil and gas flowlines as described above and introducing the hydrocarbon fluid in the internally lined pipe.

EXAMPLES

The following examples are merely illustrative and should not be interpreted as limiting the scope of the present disclosure.

Example 1—Preparation of Liner Materials Test Specimens

A series of test specimens were prepared using a commercially available extrudable grade of aliphatic polyketones (Hyosung M710, South Korea). As shown in FIGS. 5A-5C, the material was first extruded into pipe sections of 110 millimeters (mm) outer diameter (OD) (FIG. 5A) and subsequently used to machine tensile test specimens (according to ISO 527 1BA) (FIG. 5B) as well as permeation specimens (2 mm thick disks of 80 mm diameter) (FIG. 5C). In parallel, similar samples machined from a raised temperature polyethylene (PE-RT) (namely TOTAL XRT-70, Belgium) were prepared to be used as control samples and exposed to the same environment for comparison.

Example 2—Determination of Maximum Allowable Operating Temperature (MAOT) Post Exposure to Aromatic Hydrocarbons by Benchmarking to PE-RT Aged and Tested at 82° C.

The maximum allowable operating temperature (MAOT) post exposure to aromatic hydrocarbons was determined by benchmarking to PE-RT aged and tested at 82° C. PE-RT has been used in pipe materials for oil and gas applications and has been qualified by several pipe suppliers for use in aromatic hydrocarbon service up to a temperature of 82° C. according to API-15S specifications. Accordingly, the mechanical properties, such as tensile strength and modulus, of "aged" or "plasticized" PE-RT at 82° C. are sufficiently high for the product to survive and pass the API-15S performance-based qualification tests. Thus, "aged" PE-RT at 82° C. may be considered a safe threshold for benchmarking the performance of other polymers aged at higher temperatures. As shown in FIG. 6, a hypothetical Polymer X is able to retain mechanical properties above that threshold at higher temperature, post exposure to aromatic hydrocarbons, and should be suitable for RTP lining at high temperature.

Example 3—Ageing Test Protocol

A polymer ageing test protocol was carried out in accordance with ISO 23936 recommendations, but using a custom hydrocarbon composition. Tensile test samples (ISO 527 1BA) were immersed in a high pressure autoclave and exposed to an aromatic-rich hydrocarbon composition provided in Table 1 at 93° C. and 1500 psi. The polymers were aged for a total period of 90 days and retrieved every 15 days for weight uptake and length measurements. After full saturation, the polymers were extracted from the autoclave and immediately tested for tensile modulus/strength according to ISO 527 at different temperatures. The obtained values were then compared to those measured on the virgin (as-received) polymer and benchmarked against those measured on PE-RT.

TABLE 1

| Composition of the hydrocarbon environment with high aromatic content used in ageing tests | | | |
|---|---|---|---|
| Ageing conditions | Test fluid (vol %) | Liquid composition (vol %) | Gas composition (mol %) |
| 93° C. (200° F.) at 1,500 psi | 70% liquid 30% gas | 25% Toluene 15% Cyclohexane 5% Ethylbenzene 5% Xylene 10% Water 40% IRM 902 | 100% $N_2$ |

Example 4—Permeation Test Protocol

Permeation experiments were carried out using a continuous flow permeation facility and specialized gas chromatographs that allow real time monitoring of gases, water vapors and hydrocarbons diffusing through polymeric samples. The large area and API 17J compliant permeation cells use films with a diameter of 80 mm (with an active fluid diameter of 50 mm) and 2 mm in thickness. Flux versus time graphs were analyzed to calculate the permeability of the gas-polymer system.

Figure 7:
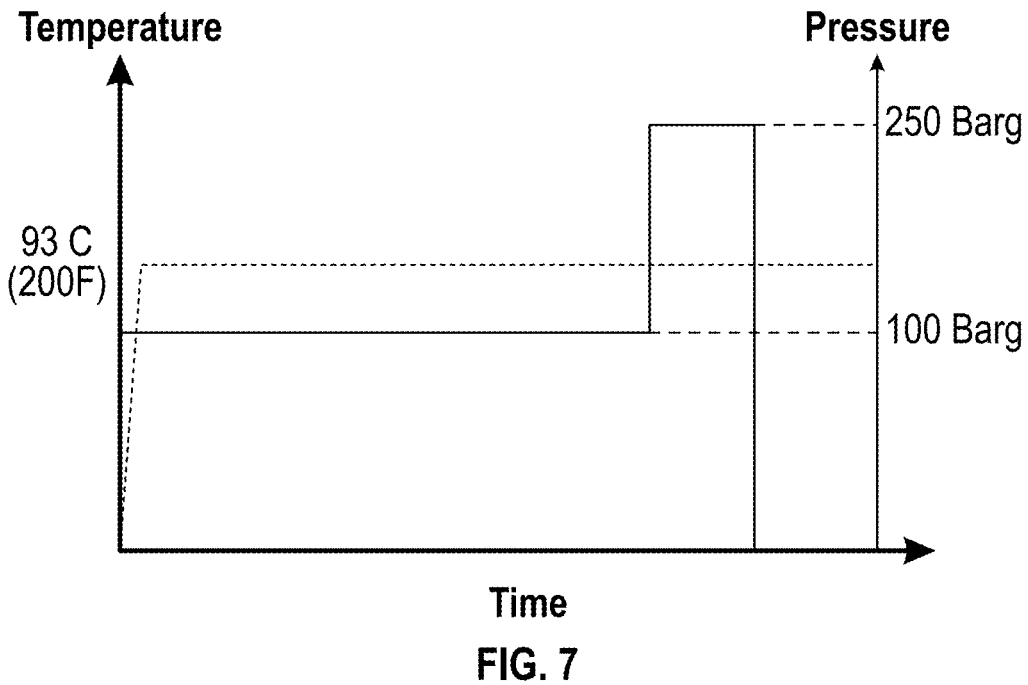
FIG. 7 is a graph showing the permeation test conditions, temperature and pressure evolution on the feed-side, during the permeation test of Example 4.

For each polymer, test specimens/disks cut out of the extruded liners were subject to permeation testing, primarily to assess their permeation barrier performance in a dry gas composition of 10% $H_2S$, 10% $CO_2$ and 80% $CH_4$. The permeation tests allowed to quantify the transport properties (solubility, diffusion coefficient and permeability) of the different species present in the test environment which not only supported the liner design (thickness) calculations, but also allowed to establish the time to saturation for each gas in a more accurate fashion. The permeation test conditions, namely the temperature and pressure evolution on the feedside during the permeation tests, are illustrated in FIG. 7. For each permeation test, and upon reaching steady state at the test temperature and pressure, the test pressure is then increased to 250 barg followed by a rapid gas decompression (RGD) at 70 bar/min to ambient pressure. This RGD cycle provided some preliminary insights into the resistance of the selected polymers to gas blistering at elevated temperature and pressure.

Example 5—Swelling and Weight Uptake

Figure 8:
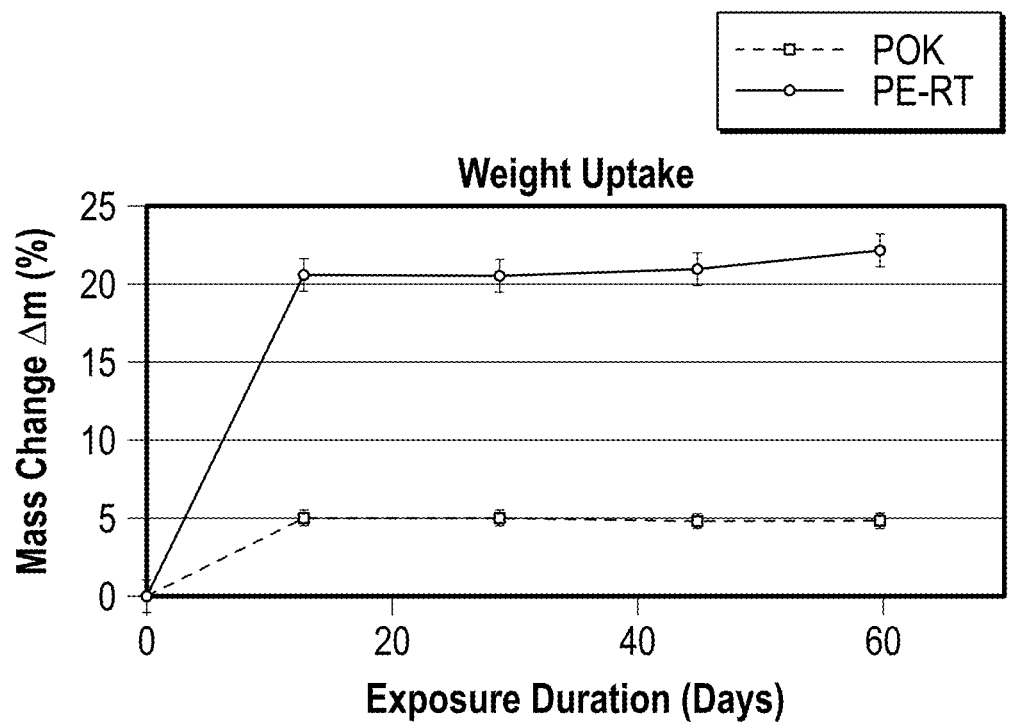
FIG. 8 is a graph showing the weight uptake in function of time for aliphatic polyketone and PE-RT samples exposed to the aromatic hydrocarbon composition at 93° C. and 1500 psi according to Example 5.
Figure 9:
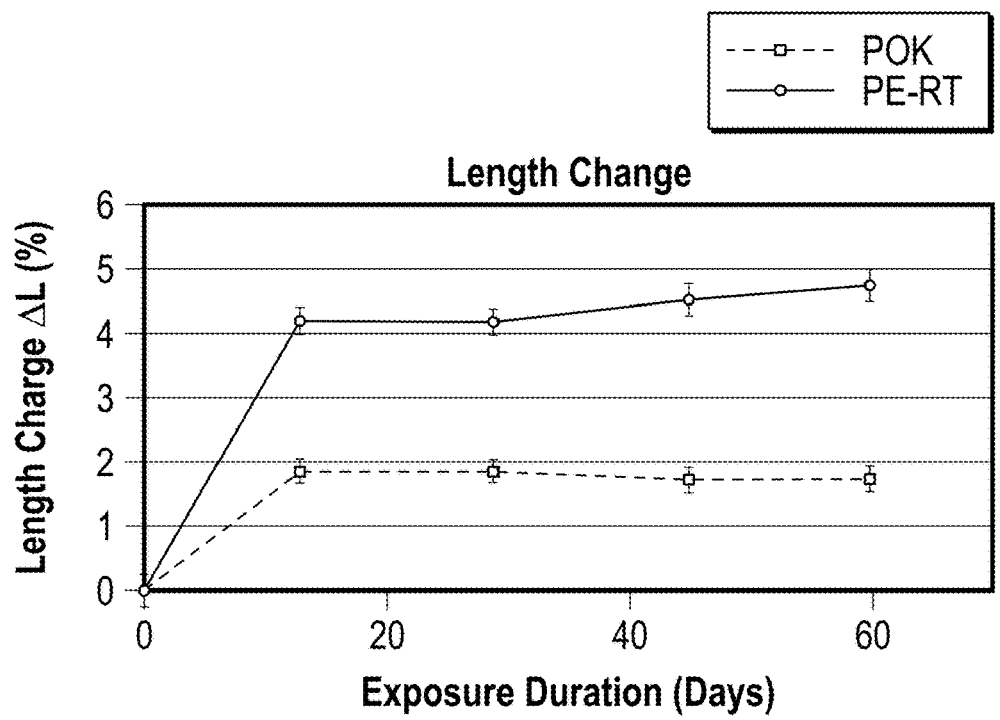
FIG. 9 is a graph showing the length change (swelling) in function of time for aliphatic polyketone and PE-RT samples exposed to the aromatic hydrocarbon composition (table 2) at 93° C. and 1500 psi according to Example 5.

FIGS. 8 and 9 show respectively the measured weight uptake and longitudinal swelling (length change) as a function of time for aliphatic polyketone and PE-RT after exposure to the high aromatic hydrocarbon mixture detailed in Table 1. The results clearly indicated a significant swelling of PE-RT in the presence of aromatics at high temperature, which was the result of the high affinity/solubility of aromatic (benzene, toluene, ethylbenzene, and xylenes or BTEX) components in the polyethylene matrix. In contrast, the aliphatic polyketone showed very limited weight uptake and swelling, namely 75% reduction in weight uptake and 50% reduction in swelling when compared to PE-RT. This translated into a reduction of the matrix plasticization effect and a better retention of mechanical properties. Interestingly, these results showed that a minimum exposure period of 2 weeks was sufficient for both polymers to reach the saturation level and establish steady state.

Example 6—Mechanical Test Results

Figure 10:
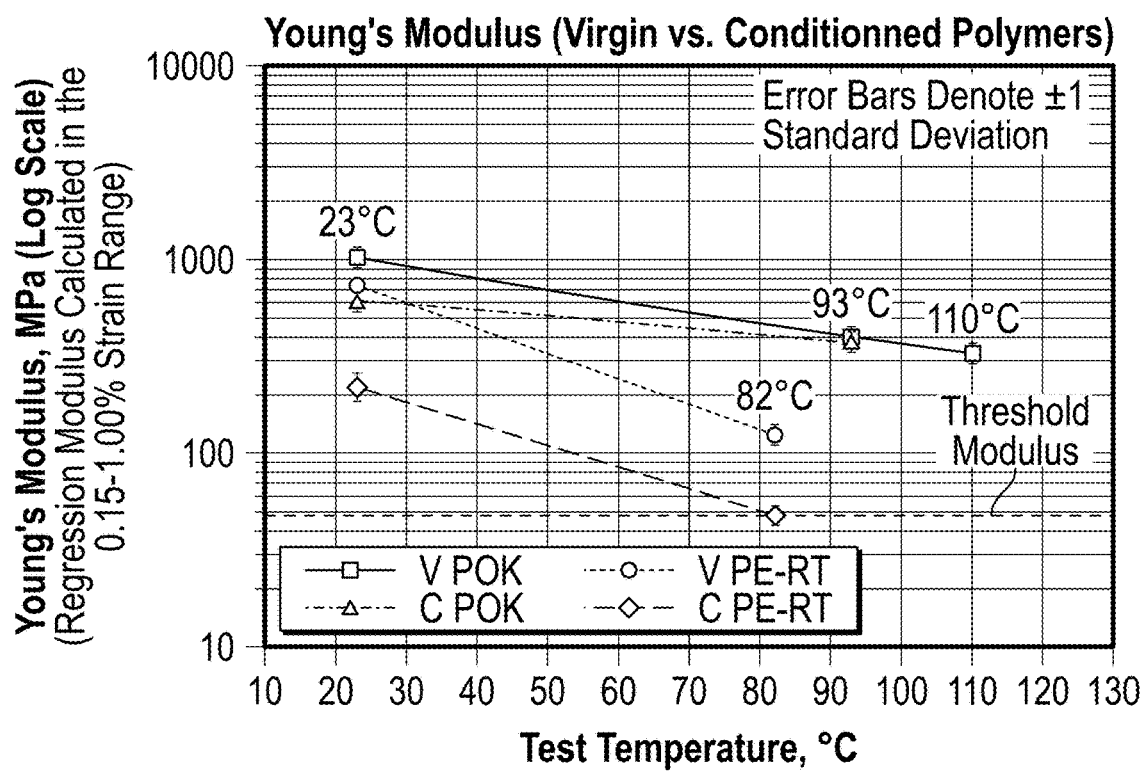
FIG. 10 is a graph showing the measured tensile modulus as function of temperature for POK and PE-RT samples before (virgin) and after (conditioned) exposure to an aromatic hydrocarbon composition at 93° C. and 1500 psi for 90 days in accordance with Example 6.
Figure 11:
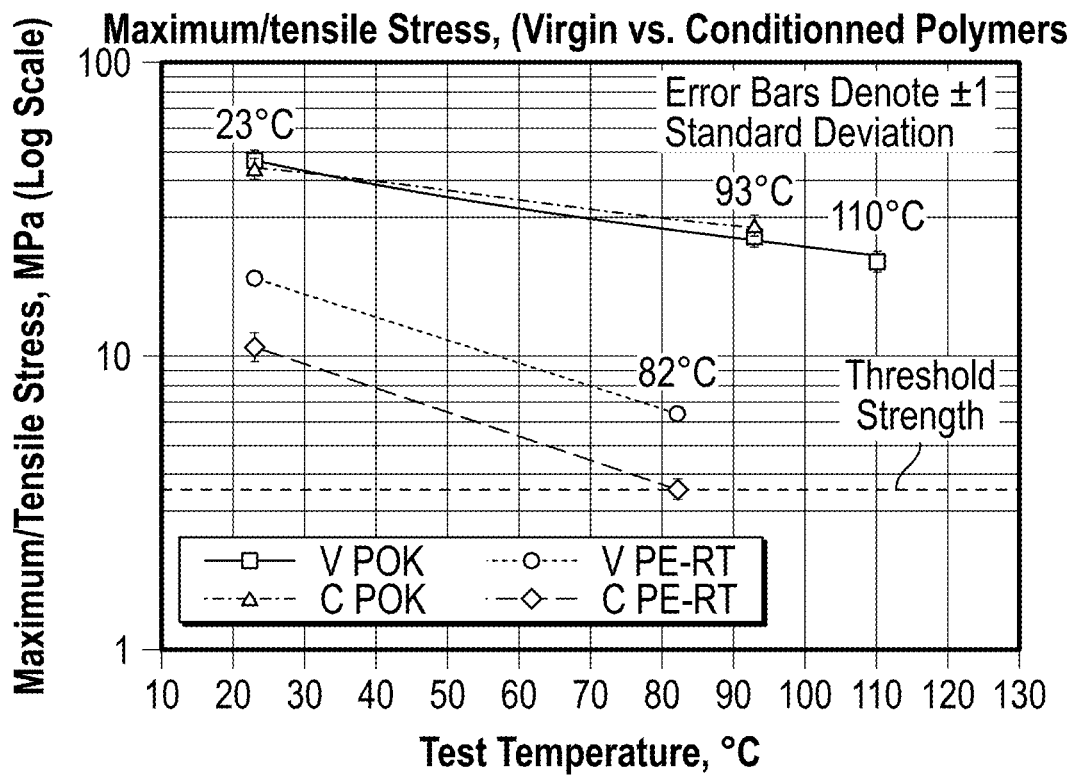
FIG. 11 is a graph showing the measured tensile strength as function of temperature for POK and PE-RT samples before (virgin) and after (conditioned) exposure to an aromatic hydrocarbon composition at 93° C. and 1500 psi for 90 days in accordance with Example 6.

Aliphatic polyketone (POK) and PE-RT polymer samples were tested for tensile properties following ISO 527 at different temperatures before and after exposure to the aromatic hydrocarbon mixture of Table 2. The test results are summarized in Tables 2 and 3 for both virgin (Table 2) and conditioned (i.e., aged) (Table 3) samples. The corresponding measurements are also graphically shown in FIGS. 10 and 11, respectively for tensile modulus and maximum tensile stress (strength).

TABLE 2

Summary of mechanical testing data (ISO 527) at different temperatures for aliphatic polyketone and PE-RT samples before (virgin) exposure to an aromatic hydrocarbon composition (Table 1) at 93° C. and 1500 psi for 90 days

| Test temperature | Material | Maximum tensile stress, MPa | % of ambient stress | Young's modulus, MPa | % of ambient modulus |
|---|---|---|---|---|---|
| 23° C. | PE-RT | 18.62 | 100.00 | 736.55 | 100.00 |
| 82° C. | PE-RT | 6.48 | 34.79 | 125.85 | 17.09 |
| 110° C. | PE-RT | | | | |
| 23° C. | POK | 47.06 | 100 | 1058.10 | 100.00 |
| 93° C. | POK | 26.12 | 56 | 402.31 | 38.02 |
| 110° C. | POK | 21.26 | 45 | 330.41 | 31.23 |

TABLE 3

Summary of mechanical testing data (ISO 527) at different temperatures for aliphatic polyketone and PE-RT samples after (conditioned) exposure to an aromatic hydrocarbon composition (Table 1) at 93° C. and 1500 psi for 90 days

| Test temperature | Material | Maximum tensile stress, MPa | % of ambient stress | Young's modulus, MPa | % of ambient modulus |
|---|---|---|---|---|---|
| 23° C. | PE-RT | 10.89 | 100.00 | 220.52 | 100.00 |
| 82° C. | PE-RT | 3.59 | 32.96 | 49.29 | 22.35 |
| 110° C. | PE-RT | | | | |
| 23° C. | POK | 44.04 | 100 | 618.65 | 100.00 |
| 93° C. | POK | 27.33 | 62 | 367.88 | 59.46 |
| 110° C. | POK | | | | |

The data provided in Tables 2 and 3 show that the temperature had a very strong impact on reduction of tensile modulus and strength of PE-RT. Swelling and plasticization induced further reduction in mechanical properties independently of the test temperature. At MAOT (82° C.), conditioned PE-RT showed 60% reduction in modulus and 45% reduction in strength when compared to virgin PE-RT at the same temperature.

These data further showed that the temperature had a modest impact on the mechanical properties of POK in the temperature range 23° C.-110° C., as compared to PE-RT. The long-term exposure to aromatic hydrocarbons at high temperature (93° C.) has modest impact on the tensile modulus measured at room temperature but negligible effect when measured at high temperature (less than 10% reduction in modulus at 93° C. for aged POK vs. virgin POK). Additionally, environmental exposure had almost no effect on the tensile strength of POK across the temperature range.

According to the data provided in Tables 2 and 3, the mechanical properties (modulus and strength) of POK at 110° C. were well above the threshold values measured on PE-RT at 82° C., which demonstrate the suitability of POK as a liner material of Reinforced Thermoplastic Pipes/Thermoplastic Composite Pipe (RTP/TCP) applications exposed to highly aromatic components at high temperature.

Example 7— Permeation Test Results

Figure 12:
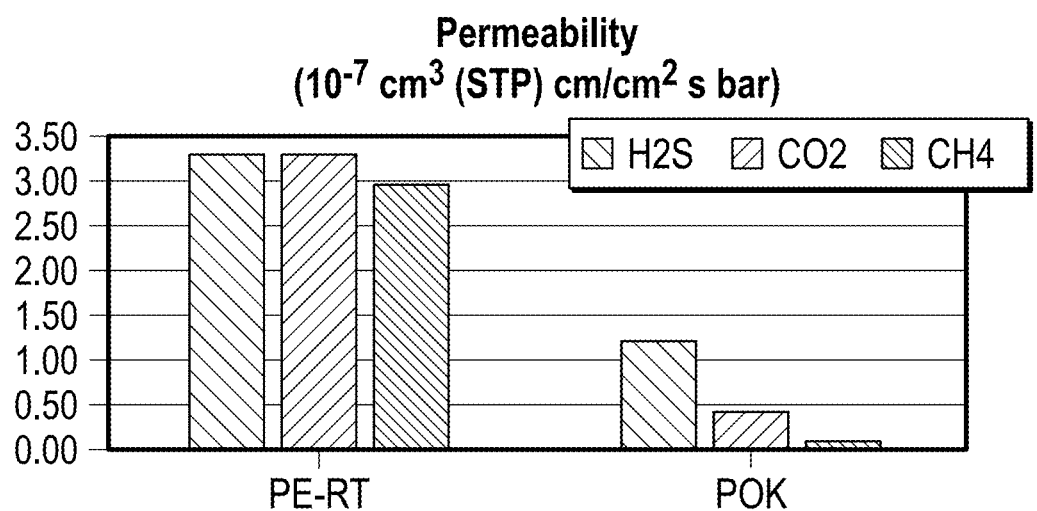
FIG. 12 is a bar chart showing the measured permeability values for $H_2S$, $CO_2$ and $CH_4$ dry gases through POK and PE-RT samples at 93° C. and 1500 psi (gas mixture: 10% $H_2S$, 10% $CO_2$ and 80% $CH_4$) in accordance with Example 7.

When selecting a material as liner material, a sufficient level of mechanical properties post exposure to aromatic hydrocarbons should be retained. Additionally, a good permeation barrier performance should be maintained towards the different gases commonly encountered in oil and gas production, namely $H_2S$, $CO_2$ and $CH_4$. FIG. 12 shows the measured permeability values for $H_2S$, $CO_2$ and $CH_4$ dry gases through POK and PE-RT samples at 93° C. and 1500 psi when exposed to a dry gas mixture: 10% $H_2S$, 10% $CO_2$ and 80% $CH_4$. These measurements clearly indicated a superior barrier performance for POK vs. PE-RT for all three gases, specifically for $H_2S$ where the permeability is reduced by over 60%. Accordingly, the use of POK as a lining material for high temperature RTP/TCP in aromatic oil and gas applications.

While only a limited number of embodiments have been described, those skilled in the art having benefit of this disclosure will appreciate that other embodiments can be devised which do not depart from the scope of the disclosure.

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed methods and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" or "optional" mean that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

The invention claimed is:

1. A non-metallic spoolable composite pipe for oil and gas flowlines, comprising:
    an inner extruded tubular liner configured to be in direct contact with a fluid comprising hydrocarbons flowing through the spoolable composite pipe;
    a polymer reinforcement layer surrounding the inner extruded tubular liner; and
    an outer extruded tubular cover surrounding the reinforcement layer;
    where the inner extruded tubular liner comprises an aliphatic polyketone having the formula (I)

(I)

where $R_1$ and $R_2$ are independently from one another the same or different,
   where $R_1$ is selected from the group consisting of hydrogen and an alkyl group, and
   where $R_2$ is an alkyl group, and
       where n is less than 0.5 and n+m=1,
       where p is an integer between 500 and 5000,
       where structural units [—CH$_2$CHR$_1$(C=O)—] and [—CH$_2$CHR$_2$(C=O)—], are randomly distributed, blocked or both, and
   where the spoolable composite pipe is configured to operate at temperatures of up to about 110° C. and to carry hydrocarbons having an aromatic content of up to about 35% by volume based on the total hydrocarbons content.

2. The non-metallic spoolable composite pipe of claim 1 configured to carry hydrocarbons having an aromatic and cyclo-aliphatic content of up to about 50% by volume of the total hydrocarbons content.

3. The non-metallic spoolable composite pipe of claim 1 configured to operate in a dry gas environment having a hydrogen sulfide partial pressure of up to 10 barg.

4. The non-metallic spoolable composite pipe of claim 1, where the spoolable composite pipe is configured to operate at temperatures of from about 80° C. to about 110° C.

5. The non-metallic spoolable composite pipe of claim 1, where the inner extruded tubular liner is a monolayer extruded tube.

6. The non-metallic spoolable composite pipe of claim 1, where the aliphatic polyketone is co-extruded with one or more thermoplastic polymer to provide the inner extruded tubular liner having a multilayer system comprising an inner aliphatic polyketone layer and a thermoplastic polymer layer surrounding the aliphatic polyketone layer.

7. The non-metallic spoolable composite pipe of claim 1, where the spoolable composite pipe is unbonded, semi-bonded, or bonded.

8. The non-metallic spoolable composite pipe of claim 1, where the polymer reinforcement layer comprises a material selected from the group consisting of dry glass fibers, aramid fibers, carbon fibers, steel fibers or strips, glass-reinforced epoxy laminates, and unidirectional thermoplastic composite tapes.

9. The non-metallic spoolable composite pipe of claim 1, further comprising a bonding layer between the liner and the reinforcement layer.

10. The non-metallic spoolable composite pipe of claim 1, further comprising a bonding layer between the reinforcement layer and the cover.

11. A method of producing the non-metallic spoolable composite pipe for oil and gas flowlines of claim 1, the method comprising:
    extruding the aliphatic polyketone having the formula (I) to form the inner tubular liner;
    forming the polymer reinforcement layer over the inner extruded tubular liner to form the non-metallic spoolable composite pipe; and
    providing the outer extruded tubular cover over the thermoplastic-based reinforcement layer.

12. A method of transporting a hydrocarbon fluid having an aromatic content of up to about 35% by volume based on the total hydrocarbons content, the method comprising:
    providing the non-metallic spoolable composite pipe for oil and gas flowlines of claim 1; and
    introducing the hydrocarbon fluid in the non-metallic spoolable composite pipe.

13. An internally lined pipe for oil and gas flowlines, comprising:
    an inner extruded tubular liner configured to be in direct contact with a fluid comprising hydrocarbons flowing through the internally lined pipe; and
    a carbon steel pipe surrounding the inner extruded tubular liner;
    where the inner extruded tubular liner comprises an aliphatic polyketone having the formula (I)

(I)

where $R_1$ and $R_2$ are independently from one another the same or different,
   where $R_1$ is selected from the group consisting of hydrogen and an alkyl group, and
   where $R_2$ is an alkyl group, and
       where n is less than 0.5 and n+m=1,
       where p is an integer between 500 and 5000,
       where structural units [—CH$_2$CHR$_1$(C=O)—] and [—CH$_2$CHR$_2$(C=O)—], are randomly distributed, blocked or both, and
   where the internally lined pipe is configured to operate at temperatures of up to about 110° C., and to carry hydrocarbons having an aromatic content of up to about 35% by volume of the total hydrocarbons content.

14. The internally lined pipe of claim 13 configured to carry hydrocarbons having an aromatic and cyclo-aliphatic content of up to about 50% by volume of the total hydrocarbons content.

15. The internally lined pipe of claim 13 configured to operate in a dry gas environment having a hydrogen sulfide partial pressure of up to 10 barg.

16. The internally lined pipe of claim 13, where the internally lined pipe is configured to operate at temperatures of from about 80° C. to about 110° C.

17. The internally lined pipe of claim 13, where the internally lined pipe has a permeability of less than about $2\times10^{-7}$ cm$^3$ (STP)·cm/cm$^2$·s·bar when exposed to a dry gas environment comprising hydrogen sulfide, carbon dioxide, and methane.

18. The internally lined pipe of claim 17, where the dry gas environment comprises about 10% hydrogen sulfide, 10% carbon dioxide, and 80% methane.

19. A method of producing the internally lined pipe for oil and gas flowlines of claim 13, the method comprising:
  extruding the aliphatic polyketone having the formula (I) to form the inner tubular liner; and
  internally lining the carbon steel pipe with the inner tubular liner.

20. A method of transporting a hydrocarbon fluid having an aromatic content of up to about 35% by volume based on the total hydrocarbons content, the method comprising:
  providing the internally lined pipe for oil and gas flowlines of claim 13; and
  introducing the hydrocarbon fluid in the internally lined pipe.

* * * * *